(12) United States Patent
Demidov et al.

(10) Patent No.: US 12,028,479 B2
(45) Date of Patent: Jul. 2, 2024

(54) SYSTEM AND METHOD FOR PROTECTING SUBSCRIBER DATA IN THE EVENT OF UNWANTED CALLS

(71) Applicant: AO Kaspersky Lab, Moscow (RU)

(72) Inventors: Alexander A. Demidov, Moscow (RU); Alexander B. Firstov, Moscow (RU); Denis E. Chistyakov, Moscow (RU); Ruslan R. Sabitov, Moscow (RU); Sergey Y. Golovanov, Moscow (RU); Victor M. Alyushin, Moscow (RU); Vladislav Y. Roskov, Moscow (RU); Igor A. Ryadovsky, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 174 days.

(21) Appl. No.: 17/726,897

(22) Filed: Apr. 22, 2022

(65) Prior Publication Data
US 2023/0075097 A1    Mar. 9, 2023

(30) Foreign Application Priority Data
Sep. 6, 2021   (RU) .................... 2021126169

(51) Int. Cl.
| | |
|---|---|
| *H04M 3/436* | (2006.01) |
| *G06F 21/62* | (2013.01) |
| *G06F 40/284* | (2020.01) |
| *G06F 40/289* | (2020.01) |
| *G06V 20/40* | (2022.01) |
| *G10L 15/22* | (2006.01) |

(Continued)

(52) U.S. Cl.
CPC ........ *H04M 3/436* (2013.01); *G06F 21/6245* (2013.01); *G06F 40/284* (2020.01); *G06F 40/289* (2020.01); *G06V 20/40* (2022.01); *G10L 15/22* (2013.01); *G10L 15/26* (2013.01); *H04M 3/42059* (2013.01)

(58) Field of Classification Search
None
See application file for complete search history.

(56) References Cited

U.S. PATENT DOCUMENTS

| | | | |
|---|---|---|---|
| 8,315,593 B2 | 11/2012 | Gallant et al. | |
| 11,689,931 B2 * | 6/2023 | Rinzler | ............. H04M 1/72463 726/22 |

(Continued)

*Primary Examiner* — Quoc D Tran
(74) *Attorney, Agent, or Firm* — ArentFox Schiff LLP; Michael Fainberg

(57) ABSTRACT

A method for protecting subscriber data includes intercepting network traffic associated with a call. The network traffic includes call parameters and call stream data. A first set of the call parameters is analyzed. A first probability value of the call being declared as unwanted is determined. The call stream data is analyzed to define a second set of call parameters. The first set of call parameters is reanalyzed based on the second set. A second probability value of the call being declared as unwanted is determined. A determination is made if the second probability value exceeds a second threshold value. The call is declared as unwanted, in response to determining that the second probability value exceeds the second threshold. The first and second sets of call parameters are transmitted to an application configured to protect data of a protected subscriber.

20 Claims, 5 Drawing Sheets

(51) Int. Cl.
*G10L 15/26* (2006.01)
*H04M 3/42* (2006.01)

(56) References Cited

U.S. PATENT DOCUMENTS

| | | | |
|---|---|---|---|
| 2008/0084975 A1* | 4/2008 | Schwartz | H04M 3/436 |
| | | | 379/88.22 |
| 2011/0170680 A1* | 7/2011 | Chislett | H04L 65/1079 |
| | | | 379/142.06 |
| 2017/0302794 A1* | 10/2017 | Spievak | H04M 3/2281 |
| 2020/0045168 A1* | 2/2020 | Sinha | H04M 3/42042 |
| 2020/0366787 A1* | 11/2020 | Sharpe | H04M 15/56 |
| 2021/0014355 A1* | 1/2021 | Quilici | H04M 3/2281 |
| 2021/0203774 A1 | 7/2021 | Piscopo et al. | |

\* cited by examiner

SYSTEM AND METHOD FOR PROTECTING SUBSCRIBER DATA IN THE EVENT OF UNWANTED CALLS

CROSS REFERENCE TO RELATED APPLICATIONS

This application claims benefit of priority under 35 U.S.C. 119(a)-(d) to a Russian Application No. 2021126169 filed on Sep. 6, 2021, which is incorporated by reference herein.

FIELD OF TECHNOLOGY

The present invention relates generally to the field of information security and, more specifically, to a system and method for protecting subscriber data in the event of unwanted calls.

BACKGROUND

Generally, almost every network subscriber (hereinafter—subscriber) has faced at some point fraudulent telephone calls (also known as phone fraud, scams). Fraudulent telephone calls are relevant to both the telephone network and the computer network, in particular internet telephony systems (VoIP: Voice over Internet Protocol telephone system, also called IP telephony) and instant messaging services, which may be used to exchange various multimedia content. The purpose of the attackers (fraudsters) may be, but is not limited to obtaining profit by deception, stealing someone else's property, gaining unauthorized access to information, and causing other disruption to the operation of information systems.

Typically, large financial losses due to telephone fraud are incurred not only by end users but also by communication service providers and various data operators that may use user data (such as a bank). Some telephone fraud schemes are similar to traditional phishing scams, like spoofed e-mails used in fraud schemes and related scams. Recently, however, new increasingly sophisticated methods of telephone scams have been emerging. For example, an attacker posing as a bank security officer may gain the trust of the victim subscriber during the conversation and may fraudulently obtain confidential bank card data (e.g., card number, validity date, CVV2 code, SMS code or push notification to confirm the transaction, authorization data in the internet banking system, and the like). As one example, once the sensitive data is obtained, the attacker may use it to attempt fraudulent bank transactions and withdraw money.

In some cases the attacker may pose as a law enforcement officer, such as a police officer. Under the pretext of investigating an illegal transaction, he/she may force the victim to transfer money to him/her or take a loan from a bank. In this case, the attacker may use various psychological techniques to exert influence over the victim. For example, using social engineering methods, the attackers may intimidate the victim with the consequences of refusing to cooperate with law enforcement agencies, and/or the consequences of providing unreliable information, etc. With aforementioned type of fraudulent scheme, even well-informed users can become victims. Clearly, an attacker may be able to determine necessary addresses, phone numbers and other information about the law enforcement agencies in advance. Therefore, attempts to verify this personal and financial information by the victim may only strengthen victim's trust in the attacker.

Fraudulent calls fall into the category of unwanted telephone communications (i.e., undesirable/unwanted calls). In other words, fraudulent calls are calls that the receiving subscribers of the telephone network do not want to receive, if they are aware of the actual intentions of the caller. Unwanted (either incoming or outgoing) calls may also include, but are not limited to the following categories: advertising; surveys; calls from organizations to which the user mistakenly provided their number; spam; intrusive calls from the subscriber's acquaintances; abusive phone calls; silent calls; telemarketing; robocalls, and the like. Usually, the target of a fraudulent attack is the called subscriber, that is, the subscriber whom the attacker is calling. However, it should be noted that in general, the victim of a fraudulent call can also be the calling subscriber if the called (receiving) subscriber is an attacker. For example, the attacker may call the victim and then end the call. In this type of attack, a careless victim subscriber may then call back the attacker. Such fraudulent call detection may be more difficult to perform because the victim him/herself has called the attacker.

Attackers may use modern technology to hide their activities and to effectively defraud users who become victims. Examples of technologies that may be used by fraudsters include, but are not limited to, IP telephony, complex call forwarding architectures using VPN servers and proxy servers, spoofed numbers, the ability to make calls from abroad, spoofing and copying a voice. Such fraud schemes are difficult to detect, not only by using automated fraud detection tools, but also difficult to detect for trained information security specialists.

In addition, the life of a modern user is difficult to imagine without the use of various internet services which the user logs into to receive services. However, from time to time various internet services, even large ones, may fall victim to attackers, resulting in huge amounts of sensitive user data falling into the hands of attackers. Such data may include identification information, such as, but not limited to, last names and first names of users, telephone numbers, bank card data, purchasing data, and the like. As a result, targeted attacks may be conducted by attackers when calling victims and they may at least need less data to make illegal transactions. For example, an attacker may know the full name and number of the user's bank card in advance and so it would be sufficient to find out the remaining details of the card from the victim to use this card illegally.

Thus, there is a need for systems to detect unwanted calls and protect subscriber data in the event of unwanted calls. However, a technical problem also arises associated with the low level of detection of unwanted calls.

SUMMARY

Disclosed are systems and methods for protecting a subscriber's data in the event of unwanted calls.

Advantageously, the disclosed method reduces false positive/false negative errors in the detection of unwanted calls.

Another advantage is an increase in the level of protection of the subscriber's data in the event of an unwanted call In one aspect, a method for protecting subscriber data in the event of an unwanted call includes intercepting, by a detection module, network traffic associated with a call. The network traffic includes call parameters and call stream data. The call parameters include two or more subscriber identifiers. A first set of the call parameters is analyzed to generate a first set of results. A first probability value of the call being declared as unwanted is determined based on the first set of results. A determination is made if the first probability value exceeds a first threshold value. The call stream data is analyzed to define a second set of call parameters, in response to determining that the first probability value exceeds the first threshold value. The second set of call parameters includes information about a data operator associated with at least one of the two or more subscriber identifiers. The first set of call parameters is reanalyzed based on the second set of call parameters to generate a second set of results. A second probability value of the call being declared as unwanted is determined based on the second set of results. A determination is made if the second probability value exceeds a second threshold value. The call is declared as unwanted, in response to determining that the second probability value exceeds the second threshold. A protected subscriber associated with the unwanted call and an unwanted subscriber associated with the unwanted call are identified. The first set of call parameters and the second set of call parameters are transmitted to an application configured to protect data of the protected subscriber.

In one aspect, the method further includes inserting, by the detection module, two or more tags into the second set of call parameters, in response to determining that the second probability value exceeds the second threshold, wherein the two or more tags declare the subscriber originating the unwanted call as the unwanted subscriber and declare the subscriber receiving the unwanted call as the protected subscriber.

In one aspect, the call stream data comprises at least one of the following: an audio stream, a video stream, an audio-visual stream, an instant message stream, a random-format data stream.

In one aspect, analyzing, by the detection module, the call stream data comprises analyzing, by the detection module, the call stream data using one or more speech recognition techniques, if the call stream data comprises the audio stream; and converting, by the detection module the analyzed audio stream into text.

In one aspect, analyzing, by the detection module, the call stream data comprises analyzing, by the detection module, the call stream data using one or more image recognition techniques, if the call stream data comprises the video stream; and converting, by the detection module, the analyzed video stream into text.

In one aspect, the method further includes extracting, by the detection module, text from the call stream data and analyzing, by the detection module, the extracted text using one or more of the following techniques: text mining, semantic analysis and syntactic analysis.

In one aspect, extracting, by the detection module, text from the call stream data further comprises extracting keywords, phrases and lexemes for determining information about the data operator by matching the extracted keywords, phrases and lexemes with known keywords, phrases and lexemes associated with information about the data operator.

In one aspect, the second set of call parameters includes at least one of: keywords, phrases, lexemes present in the call stream data and tonality of the text extracted from the call stream data.

In one aspect, analyzing, by the detection module, the first set of the call parameters comprises performing, by the detection module, a signature analysis. The first set of the call parameters is compared to a signature of an unwanted call.

In one aspect, analyzing, by the detection module, the first set of the call parameters comprises performing, by the detection module, a heuristic analysis. The first set of the call parameters is compared to heuristics of an unwanted call.

In one aspect, analyzing, by the detection module, the first set of the call parameters comprises performing, by the detection module, an analysis using a trained machine learning model to classify the call. The trained machine learning model receives the first set of the call parameters. The trained machine learning model generates the first probability value of the call being declared as unwanted.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for protecting subscriber data in the event of unwanted calls. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary

A number of terms are defined herein which will be used to describe variant aspects of the present disclosure.

Network subscriber (hereinafter referred to as subscriber) is a user having access to computer network resources or a computer communication network.

Subscriber device is a terminal, computer, or workstation connected to a computer network or computer communication network.

Callback (call) is a scheme for establishing communication between network subscribers.

(Telephone) call is a temporary connection between two or more network subscribers.

Data protection refers to measures aimed at preventing unauthorized access to information stored in a computer memory.

Personal data refers to any information relating to a physical entity, or person (the subject of the personal information), directly or indirectly identified or to be identified.

Operator (data operator) is a state body, municipal body, legal or physical entity, which independently or in conjunction with other persons is responsible for organizing and/or performing the processing of personal data. Operators may also be responsible for determining the purposes of the processing of personal data, the composition of personal data subject to processing, and actions (operations) to be performed with personal data.

Figure 1:
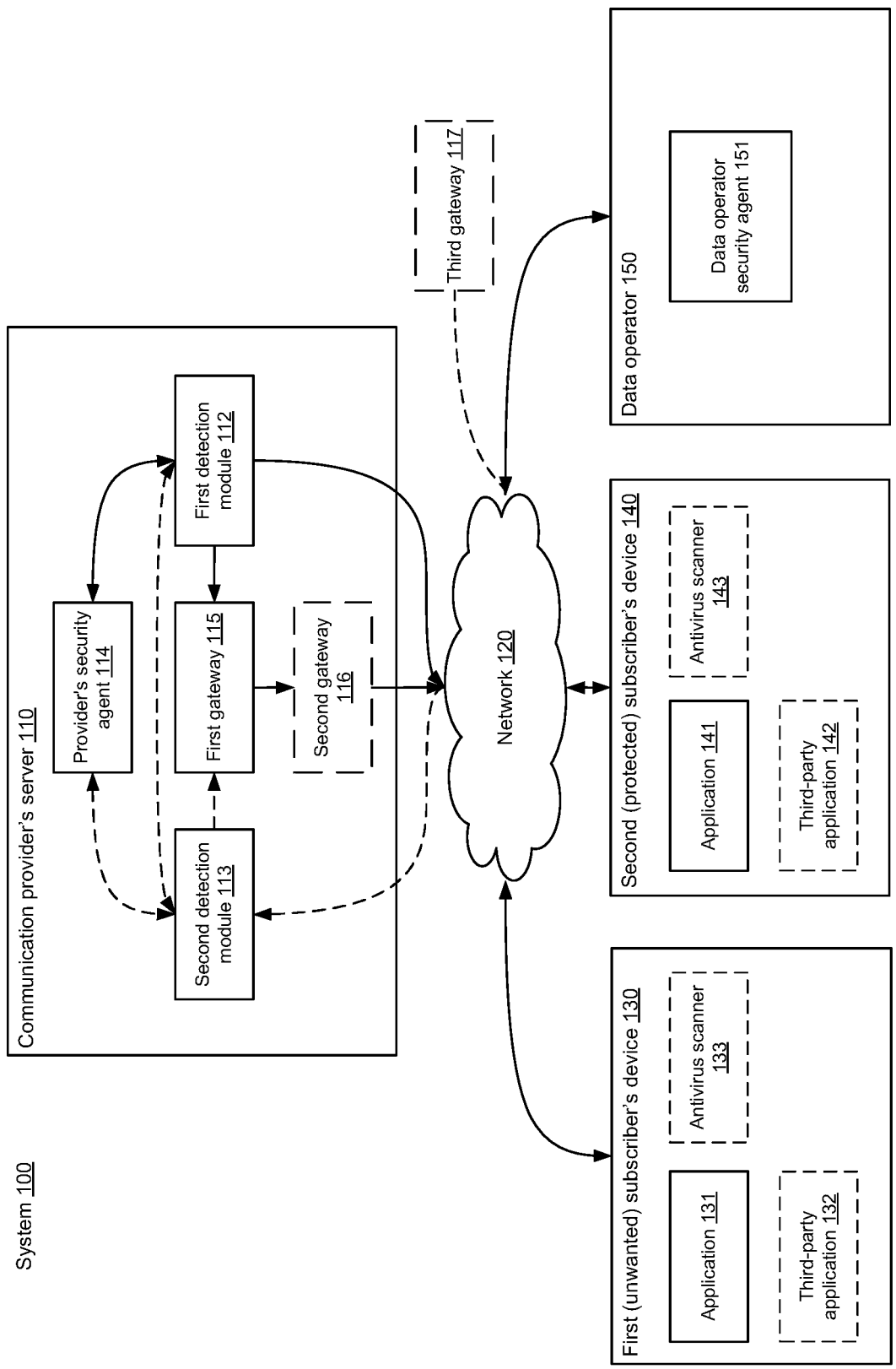
FIG. 1 illustrates an example architecture of a system for protecting subscriber data in the event of unwanted calls.

FIG. 1 illustrates an example architecture of a system for protecting subscriber data in the event of unwanted calls.

In the system 100, illustrated in FIG. 1, a telephone call (either voice or audiovisual connection) may be established between two subscribers using the devices 130 and 140. Generally, there might be three or more subscribers and/or devices participating in the call such as, for example, in the case of a conference call. However, for ease of explanation, the below description will be based on the example of two subscribers participating in the call. The subscribers' devices 130 and 140 may be any state of the art computer devices that may be used for implementing the call connection. Such devices 130 and 140 may include, but are not limited to, a mobile phone, smartphone, IP-phone (telephone communication device using the IP protocol), landline telephone, computer, etc. The communication provider's server 110 may be connected via the computer network 120 to the devices 130 and 140 and may be configured to establish communication between the devices 130 and 140, configured to transfer the call traffic, and/or terminate the communication between the subscriber devices 130 and 140. The call traffic may include, but is not limited to, call parameters (metadata) and call stream data (multimedia content). The call parameters may include, but are not limited to, identifiers of the call subscribers (for example, subscriber's phone number, subscriber device's IP address, etc.). In addition, the call parameters may include start and/or end times of the call. Call stream data may include, but is not limited to at least one of the following types of data: audio stream, video stream, instant message stream, and data streams in random format (such as files being transferred, resource links, etc.). When one subscriber makes a call to another subscriber, the Session Initiation Protocol (SIP) may be used to establish the connection. Once the connection is established, a call may be implemented wherein, for example, the Real-time Transport Protocol (RTP) can be used to transfer the call traffic. It should be noted that other well-known communication protocols, such as but not limited to, H.323, Secure Real-time Transport Protocol (SRTP) and the like, may also be used.

However, at least one subscriber's device may use IP telephony to make a call. If the other subscriber's device uses analog communication, the system 100 may have an IP adapter installed for data conversion.

The communication provider's server 110 may also include a first gateway 115 which may be configured to establish the call connection and provide follow-up call traffic between the devices of subscribers 130 and 140, and may also end the call. In an aspect, the first gateway 115 may be, but is not limited to, a proxy server, Virtual Private Network (VPN) server, or SIP server. The first detection module 112 may be communicatively coupled to the first gateway 115 and may be configured to intercept traffic containing call parameters and call stream data. The call parameters may include, but are not limited to, identifiers of the call subscribers (for example, phone number, IP address, etc.). In addition, the call parameters may include start and/or end times of the call. It should be noted that the first detection module 112 may receive mirrored traffic. To receive mirrored traffic, the first detection module 112 may be physically connected to the Switched Port Analyzer (SPAN) port on the first gateway 115. The SPAN port may be configured to mirror/duplicate packets from one port of the network switch or VPN/proxy server to another. In an aspect, the call parameters may additionally include at least one of the following: information about the data transfer protocol used during the call (for example, one or more of: SIP, RTP, IP); duration of the call (current duration for an ongoing call or total duration for a completed call); the time the call connection ended for a completed call (that is, the time when the call connection terminated and the call was completed).

The first detection module 112 may receive inbound or outbound traffic from the first gateway 115. In an aspect, the communication provider's server 110 may include a second detection module 113, which may be communicatively coupled to the first detection module 112 and may be configured to intercept traffic (inbound or outbound) that is not intercepted by the first detection module 112, respectively. According, deployment of two connected detection modules 112-113 may enable both outbound and inbound call traffic to be analyzed and more call parameters to be determined. The inbound traffic of the first gateway 115 may include, for example, the original identifier (e.g. the telephone number) of the first subscriber who is using the first subscriber's device 130. At the same time, the outbound traffic of the first gateway 115 may contain the original identifier of the second subscriber who is using the second subscriber's device 140. In addition, if the first subscriber uses spoofing (modification) of their identifier, the outgoing traffic may also contain the specified spoofed identifier of the first subscriber and may not contain the original identifier of the first subscriber. Thus, the use of two detection modules 112 and 113 enables the system 100 to determine more call parameters, which results in an increased level of detection of unwanted calls. The increased level of detection of unwanted calls may in turn reduce false positive/false negative errors in the detection of unwanted calls. A possible implementation of the first detection module 112 and the second detection module 113 is discussed below in conjunction with FIG. 2.

In an aspect, the first detection module 112 and the second detection module 113 may be communicatively coupled, for example, by means of a network 120. In an aspect, the second detection module 113 may insert a predefined data packet into the traffic it receives. When the first detection module 112 detects the said predefined data packet in the received traffic, the first detection module 112 may add specific call parameters to the call parameters that were detected by the second detection module 113. Thus, the second detection module 113 may determine the original identifier of the first subscriber, but may not be able determine the identifier of the second subscriber. At the same time, the first detection module 112 may detect the spoofed identifier of the first subscriber and the original identifier of the second subscriber. As a result, the first detection module 112 may receive the original first subscriber identifier from the second detection module 113 in the form of call parameters.

An unwanted call can occur if a large number of intermediate gateways is used, such as the first gateway 115 on the communication provider's server 110 and the second gateway 116, which are not located on the communication provider's server 110 but are also communicatively coupled to the network 120. Attackers may use elaborate schemes to hide their fraudulent activities and to spoof their identifier (for example, their phone number). One example of such attack may be a telephone call made using the first subscriber's device 130 (which is unwanted) to a second subscriber's device 140 (the victim). In the call traffic, in the call parameters the number of the calling subscriber may be specified as the original telephone number of the first subscriber and the number of the called subscriber may be specified as any third identifier—the IP address of a fraudulent third gateway 117. In this case, the first gateway 115 may send the call traffic to the fraudulent third gateway 117, because the first gateway 115 may consider it to be a called subscriber. The third gateway 117 may be fraudulent and may contain a list with a large number of spoofed phone numbers that are used for fraudulent calls. Next, the third gateway 117 may select one of the spoofed numbers and may make a call, where the selected spoofed phone number may be specified as the calling number and the phone number of the second subscriber-victim may be specified as the called number. The traffic of the specified subscriber may return via the first gateway 115 of the communication provider's server 110 and then may go to the second subscriber's device 140. On the second subscriber's device 140, a spoofed phone number may be indicated as the number of the called subscriber, instead of the original number of the first subscriber. But in the outbound traffic intercepted by the first detection module 112, the calling subscriber identifier may contain the IP address of the fraudulent third gateway 117.

It should be noted that a fraudulent scheme may contain a large number of intermediate gateways like the third gateway 117 or second gateway 116. Moreover, these gateways can physically reside on different remote servers in different countries, and use different protocols (SIP, VPN, proxy) to spoof numbers and hide fraudulent activities. Therefore, technologies that check calling telephone numbers by "blacklisting" telephone numbers of attackers may not always be able to identify unwanted and fraudulent calls. In an aspect, the disclosed system may use all intercepted traffic to analyze call parameters and identify fraudulent calls and, more broadly, all unwanted calls. It should be noted that the traffic intercepted by the first detection module 112 may contain the real identifier of the first subscriber—in this example, the IP address of the third gateway 117, while the spoofed telephone number may not be contained in this traffic. In an aspect, the first detection module 112 may request a specific spoofed telephone number from the provider's security agent 114. At the same time, the provider's security agent 114 may be a technical tool configured to run on the processor of the device (for example, the server) of the communication provider 110. The security agent 114 may be configured to protect the protected subscriber's data which may be stored on the communication provider's server 110, taking into account the parameters of the unwanted call. In an aspect, the first detection module 112 may obtain the specified spoofed telephone number from the second detection module 113 if this second detection module 113 has embedded a specific data packet into the intercepted traffic, allowing the calls intercepted by both first detection module 112 and the second detection module 113 to be compared.

In an aspect, the system 100 may utilize a single first detection module 112 that may intercept outbound traffic from the first gateway 115. The first detection module 112 as well as the second detection module 113 may be configured to run on the processor 21 of the computer device 20 (see FIG. 5). That is, in different aspects, the first detection module 112 and the second detection module 113 may be either separate computer devices 20 or virtual machines running on the processor 21 of the computer device 20. In the second example, the first detection module 112 and the second detection module 113 may be implemented as two different virtual machines implemented on the processor 21 of a single computer device 20 or of two different computer devices.

The first detection module 112 may also be configured to perform a preliminary analysis of the call parameters, the results of which may be used to determine a first probability of a call being identified as unwanted. In the event that the first probability exceeds a first threshold value, the first detection module 112 may utilize analysis of the call stream data to determine additional parameters of the analyzed call. Additional call parameters may include, but are not limited to, information about at least one data operator (such as, for example, the identifier or name of the data operator) on the server of which data for at least one of the subscribers is stored.

In an aspect, the first detection module 112 may perform analysis of the stream data using one of the following:

audio stream speech recognition methods followed by conversion from audio into text if the stream data includes an audio stream;

video image recognition methods followed by conversion from video into text if the stream includes a video stream;

at least one of the following methods of text analysis: text mining, semantic analysis, syntactic analysis, wherein the analyzed text is extracted from the stream data.

The first detection module 112 may be configured to re-analyze the call parameters based on the additional parameters, the results of which may be used to determine a second probability of the call being identified as unwanted. If the second probability exceeds a second threshold value, the first detection module 112 may identify (declare) the call as unwanted and may also identify the subscriber making the unwanted call (hereafter referred to as the unwanted subscriber) and the subscriber whose data is protected in the event of an unwanted call (hereafter, the protected subscriber). It should be noted that in general, the unwanted subscriber can be either the caller or the recipient of an unwanted call. Accordingly, the phrase "making the unwanted call by the unwanted subscriber" should be understood as performing unwanted actions, some of which are described in the background section, towards protected subscriber (or victim). The identification of the unwanted subscriber and the protected subscriber can be based on the subscriber identifiers included in the call parameters. In an aspect, the first detection module 112 may add unwanted subscriber and protected caller tags to the call parameters, as well as the information that the call has been identified as unwanted.

In an aspect, the first detection module 112 may also requests additional call parameters, for example, from the application 141 on the protected subscriber's device 140. The application 141 may be configured to run on the processor of the device 140. These additional parameters may include protected data on the protected subscriber device 140 and protected subscriber activity data, for example, but not limited to:

interaction between the protected subscriber's device 140 and other devices on the network 120;

access to resources of the protected subscriber's device 140 (memory, processor, etc.);

list of resources to be accessed;

the specifications of the protected subscriber's device 140 (e.g., type and version of the installed Operating System (OS), installed software, hardware specifications of the device—the processor used, memory, etc.)

data transfer;

the type of data transferred (e.g. commands, raw data, encrypted data, etc.)

events of the antivirus scanner 143 (security tool) installed on the protected subscriber's device 140 and associated with the application 141. Antivirus scanner 143 events may include, but not limited to, the following: detection of a malicious file, disabling of self-protection, a failed upgrade attempt, and other events of the antivirus scanner and antivirus modules 143 (described below in conjunction with FIG. 3);

the type of subscriber activity.

However, the type of subscriber activity may include but is not limited to one of the following:

location at a specific position (by device coordinates);
driving a vehicle;
interaction with at least one of the user's devices;
interaction with new devices.

As used herein, the term "subscriber activity" refers to, in particular, the movement of the subscriber (change of location), the interaction of the subscriber with devices, the interaction of the subscriber with services (for example, interaction with the email application on the subscriber device), the interaction of the subscriber devices or services among themselves (for example, installation of a new application on the device, data exchange between two or more subscriber devices).

The aforementioned additional call parameters, in particular the data on the activity of the protected subscriber and its location, may indicate that the protected subscriber is subject to fraudulent activity during an unwanted call, after the completion of an unwanted call, or between multiple unwanted calls from a single unwanted subscriber. For example, if the location of the protected subscriber has changed to a location near a bank or Automated Teller Machine (ATM), this location may indicate a threat to the protected subscriber's bank card data. Such threat may exist in case the attacker may have forced the protected subscriber to withdraw money or transfer money to the number of the attacker's card. Therefore, these additional call parameters may help the first detection module 112 to identify an unwanted call and improve the protection of the protected subscriber's data.

The first detection module 112 may also be configured to transfer all of the parameters of an unwanted call (including the additional parameters discussed above) to at least one of the following: the application 141 on the device 140 of at least the protected subscriber, the security agent of at least one of the above-mentioned data operators 151 on the data operator server 150, the security agent 114 on the communication provider server 110. The specified application 141 and security agents 151, 114 may be configured to protect the protected subscriber data on the user device 140, the data operator server 150, and the communication provider server 110, respectively, taking into account the parameters of the unwanted call. In this case, in an aspect, the protected subscriber data stored on at least one of the above-mentioned devices (i.e. the user's device 140, the data operator's server 150, the communication provider's server 110) may be identified according to the identifier of the protected subscriber. The security agent 151 may be a tool configured to run on the processor of the server of the data operator 150 and it may be configured to protect the protected subscriber's data stored on the server of the data operator 150, taking into account the parameters of the unwanted call. The first detection module 112 may be configured to determine that the data operator 150 and the security agent of the data operator 151 may be employed to protect the protected subscriber's data based on the data operator information contained in the additional call parameters (for example, the name or identifier of the data operator). In addition, a list of possible data operators may be contained in the first detection module 112 in advance. Therefore, if one or more data operators are included in the data operator information for the protected subscriber, then the first detection module 112 may transfer the parameters of a call identified as unwanted to the security agents 151 of only those data operators 150 that match the protected subscriber and if the information about the security agents 115 is included in the additional call parameters.

In an aspect, the first detection module 112 may also request additional call parameters, for example, from the application 131 of the unwanted subscriber's device 130, in the event that the unwanted subscriber's device 130 has an application 131 installed on it configured to run on the processor of the unwanted subscriber's device 130. These additional parameters may include, but are not limited to, data from the unwanted subscriber's device 130 and unwanted subscriber activity data, analogously to the protected subscriber activity data previously mentioned. Thus, the unwanted subscriber activity data may include, but is not limited to:

interaction between the unwanted subscriber's device 130 and other devices on the network 120;
access to the resources of the unwanted subscriber's device 130;
a list of resources to be accessed;
specifications of the unwanted subscriber's device 130;
data transfer;
type of data transferred;
events of the antivirus scanner 133 (security tool) installed on the unwanted subscriber's device 130 and associated with the application 131 (see FIG. 3); and
the type of subscriber activity.

Figure 2:
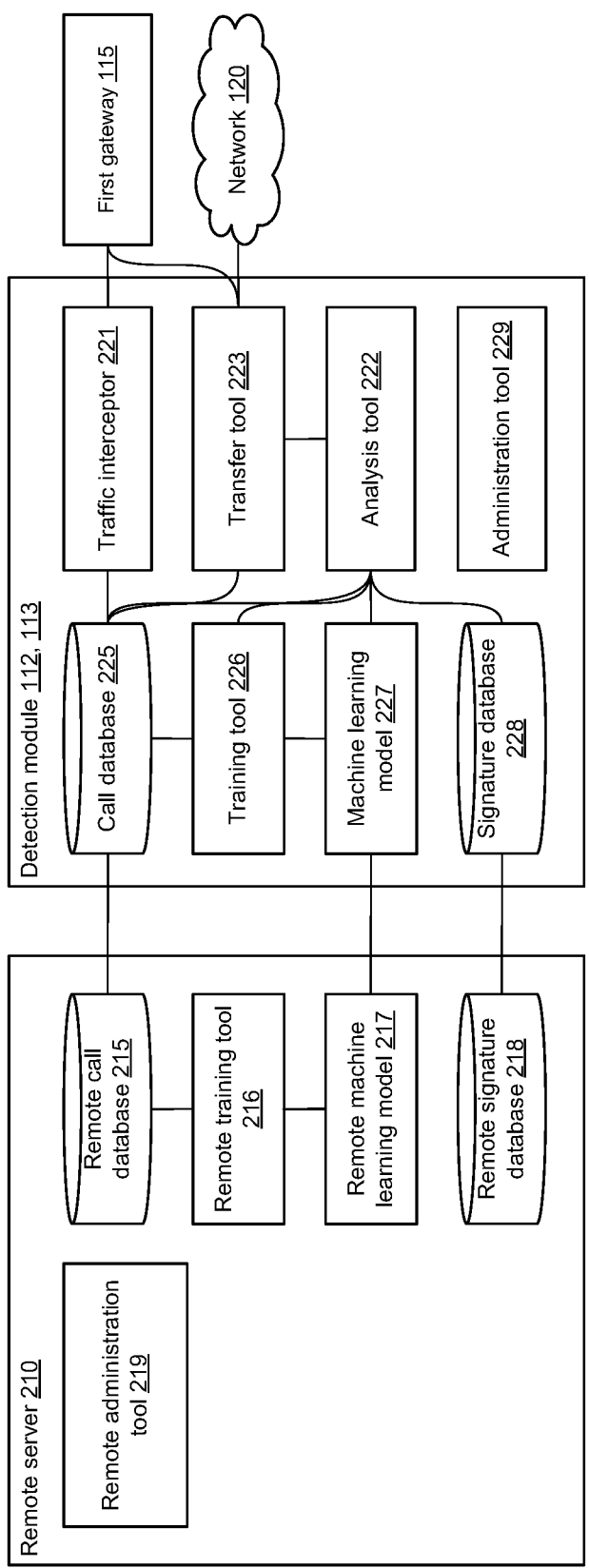
FIG. 2 is an example system diagram illustrating a detection module.

FIG. 2 is an example system diagram illustrating the first detection module 112 and the second detection module 113. The tools of the first detection module 112 (as well as the second detection module 113) may be configured to implement the functionality of the aforementioned first detection module 112 and to implement functionality that will be described later. For example, the traffic interceptor 221 may be configured to intercept traffic through the first gateway 115 containing call parameters and call stream data. Furthermore, the traffic interceptor 221 may be configured to store the call parameters and call stream data in the call database 225 stored on a machine-readable medium, such as a ROM 24. The traffic interceptor 221 may be communicatively coupled via a network interface to the first gateway 115, for example, to the SPAN port of the first gateway 115.

In addition, intercepted traffic related to the particular call can be stored in the call database 225. The analysis tool 222 may be configured to perform a preliminary analysis of the call parameters from the call database 225. Based on the results of such analysis, the analysis tool 222 may determine a first probability of the call being identified as unwanted. In addition, the analysis tool 222 may also identify additional parameters for the above-mentioned call in the event that the first probability mentioned above exceeds a first threshold value. The analysis tool 222 may identify additional parameters by analyzing the stream data of the call. The additional parameters of the call may include, but are not limited to, information about at least one data operator associated with the at least one subscriber, that is, the data operator which performs the storage and processing functions of the specified subscriber. The analysis tool 222 may store the additional call parameters in the call database 225.

The analysis tool 222 may also be configured to perform a re-analysis of the call parameters based on the additional parameters and to determine a second probability that a call will be identified as unwanted from the results of the re-analysis. The analysis tool 222 may also be configured to identify the call as unwanted in the event that the second probability exceeds a second threshold value. The analysis tool 222 may be configured to determine the unwanted subscriber and the protected subscriber. The determined information may also be stored in the call database 225. The transfer tool 223 may be configured to transfer the parameters of the above-mentioned call, identified as unwanted, from the call database 225 to the application 141 on the protected subscriber's device 140, to the security agent 151 of the at least one above-mentioned data operator, and to the security agent 114 on the communication provider's server 110 either over the network 120 or directly. However, if the call was not identified as unwanted (the second probability is below the second threshold value), the analysis tool 225 may wait for the call parameters and call stream data to be updated. When the specified data is updated (for example, new call stream data, new call parameters, etc. have been obtained), the analysis tool 225 may be configured to again perform a preliminary analysis and re-analysis of the call parameters based on the updated data.

In an aspect, the analysis tool 222 of the first detection module 112 may be configured to determine information about the data operator associated with the at least one subscriber by matching the extracted keywords, phrases, and lexemes from the call stream data against a predefined list of keywords, phrases, and lexemes that are associated with a predefined list of data operators. For example, the following keywords and phrases may have been extracted from the call stream: "bank", "bank card", "bank A". The data operator list may contain a data operator named "Bank A", which matches the keyword "Bank A" in the keyword list. Therefore, the first detection module 112 may determine information about the data operator associated with the subscriber, namely that named "Bank A".

However, if the stream data contains audio data, the analysis of the stream data (audio stream) by the analysis tool 222 may include the use of speech recognition methods to extract text from the speech in the audio stream and an analysis of the extracted text to further extract the above-mentioned keywords, phrases and lexemes. In an aspect, if the stream data includes video data, the analysis of the stream data (video stream) by the analysis tool 222 may include extracting keywords, phrases, and lexemes from the traffic video stream using image recognition methods. In this case, sign-language recognition or recognition of the lip movement of subscribers in the video stream may be performed. In other words, the analysis tool 222 may be configured to perform speech recognition by means of lip reading and may convert such speech to text. In addition, optical character recognition (OCR) methods may be used by the analysis tool 222, if textual data is present in the video stream. For example, the subscriber may show a sheet of paper containing text. In an aspect, if the stream data includes instant messages, then the analysis of the stream data (of instant messages) by the analysis tool 222, as well as the analysis of text extracted from audio or video streams, may include text analysis methods involving extracting keywords, phrases, and lexemes, such as: text mining, semantic text analysis, syntactic text analysis (also segmentation, parsing), and the like.

Figure 3:
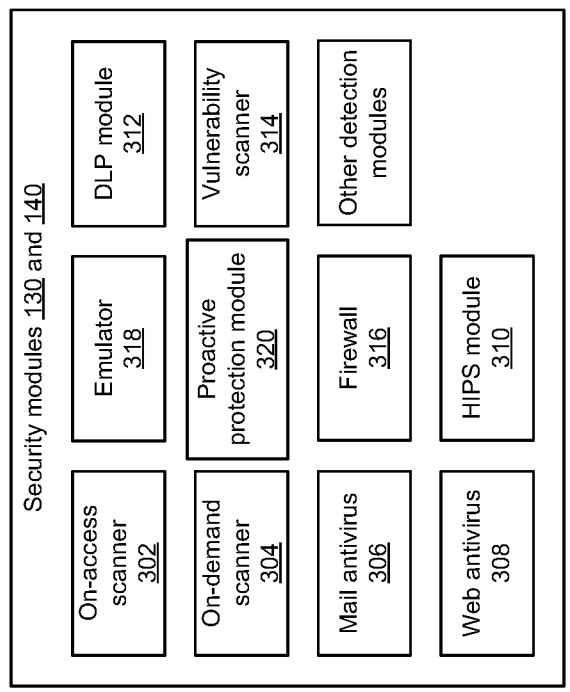
FIG. 3 is an example system diagram illustrating antivirus scanner modules for protecting subscribers' devices.

In an aspect, if the stream data includes a data stream of arbitrary format, the contents of the specified data stream may be analyzed for malicious content using an antivirus scanner (see FIG. 3). Furthermore, the contents of the data stream having arbitrary format may be analyzed for the presence of keywords, phrases and lexemes using text analysis methods.

In an aspect, the traffic interceptor 221 of the first detection module 112 may be additionally configured to communicate with at least one other computer device for detecting an unwanted call (for example, the second detection module 113). The traffic interceptor 221 may also be configured to receive call parameters from the second detection module 113.

In an aspect, the above-mentioned embedding of a specific data packet into the traffic may be implemented using the traffic interceptor 221 of the second detection module 113. The subsequent detection of the embedded packet may also be implemented by the traffic interceptor 221 belonging to the first detection module 112.

In an aspect, the traffic interceptor 221 may additionally be configured to receive call parameters from the application 141 (or 131) installed on the subscriber's computer device 140 (or 130 respectively).

In an aspect, the additional parameters may include, but are not limited to keywords, phrases, and lexemes present in the stream data. The additional parameters may also include the tonality of the text extracted from the stream data (for example, an audio stream). In this case, in an aspect the tonality of the text (a conversation) may be determined by the analysis tool 222 using analysis methods for text tonality (such as sentiment analysis, opinion mining). The analysis tool 222 may determine the tonality by analyzing the text selected from the stream data and consisting of the above-mentioned words, phrases and lexemes.

In an aspect, the preliminary analysis of the call parameters may include, but is not limited to, at least one of the following:

i) a signature analysis, in which, if the call parameters match the signature of an unwanted call, a first probability is determined that the call will be identified as unwanted above the first threshold value. For example, the following signature could be used: the identifier of one of the subscribers is included in the list of fraudulent identifiers;

Ii) a heuristic analysis in which, if the call parameters match the heuristics of an unwanted call, a first probability is determined that the call will be identified as unwanted above the first threshold value;

Iii) an analysis using a trained machine learning model 227 to classify a call as unwanted/regular. The above-mentioned model may receive the call parameters as input, and may generate the result as a first probability of a call being identified as unwanted and a first threshold value.

In this case, the signature database 228 may be stored on a machine-readable medium and may contain the above-mentioned signatures and heuristics of unwanted calls.

In the case of a trained machine learning model 227, the model may be stored on a machine readable medium and may be trained by the first detection module 112 using the training tool 226.

In an aspect, the first detection module 112 may be communicatively coupled to a remote server 210 which may be configured to update the signature database 228 using a remote signature database 218. The remote server 210 may also be configured to train the remote machine learning model 217 and use it to update the machine learning model 227, by employing the first detection module 112. The aforementioned updating of the machine learning model 227 may consist of replacing the machine learning model 227 on the first detection module 112 with a remote machine learning model 217. The updating may also consist of copying of the parameter values of the remote machine learning model 217 for the machine learning model 227. The remote server 210 may contain the remote call database 215. The remote call database 215 may include the records of the call database 225 of the one or more detection modules 112 and 113. In addition, the remote server 210 may include a remote training tool 216 which may be configured to train and re-train the remote machine learning model 217 based on the data in the remote call database 215. For completeness, a more detailed description for the training of the machine learning model 227 using the training tool 226 is provided below. However, the implementation options described below may also apply to the training of the remote model 217 using the remote training tool 216 on the remote server 210. Thus, the training tool 226 may be employed to train and re-train the machine learning model from a training data sample from the call database 225. The training sample may include feature values based on the call parameters for a historical observation period (e.g. one week, one month). It should be noted that the term "re-training" refers herein to a repeated training of the model 227 on new data or using new model parameters 227. The term "re-training" also refers herein to the repeated training of the model 227 using a new specification of the model 227. For example, retraining may mean replacing the neural network by a logistical regression for the machine learning model 227. In an aspect, the re-training of the model 227 may be performed periodically, for example, once a month. Another aspect may utilize an online machine learning method in which the data may become available in sequential order and may be used to update the model 227 parameters for future incoming data at each step. That is, the model 227 may be re-trained every time new data is received. Such an approach enables better consideration of changes in the behavior of attackers and/or victims of fraud.

The machine learning model 227 may be any known or later developed machine learning model. A few possible non-limiting machine learning models are listed below.

If the training sample contains a small number of examples with unwanted calls (that is, the number of examples with unwanted calls is, for example, less than 10 or less than 1% of the total number of examples), then the machine learning model may be used under the pre-condition that the features of the training sample conform to a Gaussian distribution. In this case, the sample mean and sample variance for the training sample may be estimated for each feature, and then the combined probability density distribution may be calculated. As a result, if the first probability of the call being identified as unwanted, estimated on the new data, turns out to be above a threshold (a specific inverse distribution), then the call may be identified as unwanted. However, the device of a subscriber that is unwanted or protected can be identified from the lowest probability density value for call features related to an unwanted/protected subscriber, respectively. In this case, the test and validation samples may contain a small number of examples with unwanted calls, sufficient to determine the quality of the model and subsequently to adjust the model parameters to maximize the quality. In addition, time series models such as AutoRegressive Integrated Moving Average (ARIMA), ARIMAX (an extended version of the ARIMA model) and others may be used as the machine learning model 227.

When the training sample contains a large number of examples containing information on unwanted calls, then classification models such as logistic regression, neural networks, decision trees, decision forests, support vector machine methods, nearest neighbor methods, and the like may be used. Such a machine learning models for classification may be configured to classify the call as unwanted/regular.

In an aspect, the machine learning model 227 may contain a set of models. The set of models may be an ensemble of models that makes a decision by averaging the results produced by the individual models from the set. In an aspect, the neural network may be optimized using genetic algorithms. In an aspect, the neural network may be chosen using one of the quality metrics, such as Numenta Anomaly Benchmark (NAB) or F1 metrics.

In an aspect, the construction of the machine learning model 227 may proceed as follows. Firstly, the neural network architecture template may be selected. The neural network architecture template may include for example, but not limited to: multilayer perceptron, convolutional neural network, recurrent neural network, et cetera. The following describes the selected architecture:
optimizer and its parameters;
initial weight coefficients and offsets;
maximum number of layers;
for each layer:
a list of possible layer types consisting of at least a subset of the following layers: Dense, Convolutional, Gated Recurring Units (GRU), Long Short-Term Memory (LSTM), Dropout activation function: Linear, Rectified Linear Unit (ReLU), Tanh, sigmoid, Softmax, etc.; possible layer size (number of neurons in the layer).

The neural network architecture may be optimized using an optimizer. In an aspect, the neural network architecture may be optimized using genetic algorithms. A genetic algorithm, as would be known to one skilled in the arts, is used to define the neural topology and inputs that will provide the most accurate neural networks. A quality metric may also be used to select the best architecture. In an aspect, a quality metric, for example, an NAB metric, an F1 metric, and the like may be used.

The first detection module 112 may optionally be configured to receive feedback (for example, via the transfer tool 223) from the application 141 of the protected subscriber's device 140, from the security agent 151 of the data operator 150, or from the security agent of the provider 114. The feedback may either acknowledge or deny the unwanted call, and this information may be included in the training sample for re-training the machine learning model 227. Thus, the re-training of the model 227 may help reduce false positive/false negative errors when identifying an unwanted call.

In an aspect, the re-analysis of the call parameters may include, but is not limited to, at least one of the following:
a signature analysis, in which, if the call parameters match the second signature of an unwanted call, a second probability is determined of a call being identified as unwanted above the second threshold value;
a heuristic analysis in which, if the call parameters match a second heuristic of an unwanted call, a second probability is determined of the call being identified as unwanted above the second threshold. For example, the following heuristic (rule) may be used: the product of the number of calls between the specific subscribers (subscribers are identified by the subscriber identifiers) and the duration of calls in seconds in which at least three keywords are mentioned exceeds 1000. When the specified heuristic is implemented, the second probability of the call being identified as unwanted may be set to 1, which may be higher than the second threshold (for example, 0.5). Otherwise, if the above-mentioned product is less than 1000, the second probability of identifying the call as unwanted may be set to 0, that is, below the second threshold value.

An analysis performed using a trained second machine learning model may classify the call as unwanted/regular. The aforementioned second model may receive the call parameters as input. The result of the application of the second model may be a second probability of a call being identified as unwanted and a second threshold value.

It should be noted that the aspects for the machine learning model 227 may also apply to the second machine learning model. The difference is that the trained second machine learning model may also accept additional call parameters as input. The result of applying this second model may be the second probability of the call being identified as unwanted and the second threshold value. In this case, the training tool 226 may be additionally configured to train the second machine learning model. In addition, the second machine learning model may be trained on the remote server 210 using the remote training tool 216.

Also in an aspect, the signature database 228 may be stored on a machine-readable medium and may contain the second signatures of an unwanted call and the second heuristic of an unwanted call. The trained second machine learning model may also be stored on a machine-readable medium.

In an aspect, the protected subscriber's application 141 may protect the protected subscriber's data on the protected subscriber's device 140, based on the parameters of the unwanted call, by performing at least the following actions:
notifying a third-party application 142 installed on the protected subscriber's device 140 that the call was identified as unwanted (in this case, the parameter considered may be the unwanted call tag);
changing the information security settings of the protected subscriber's device 140 on which the application 141 is installed (in this case, the parameter considered may be the unwanted call tag);
notifying the protected subscriber that the call was identified as unwanted (in this case, the parameters considered are the unwanted call tag, the unwanted subscriber identifier);
ending the current call and blocking subsequent incoming or outgoing calls with the unwanted subscriber (in this case, the parameters considered may be the unwanted call tag, the unwanted subscriber identifier, wherein the unwanted subscriber identifier may be verified for subsequent call attempts and if a call with an unwanted subscriber identifier is received, the incoming call will be blocked).

In an aspect, at least one, for example, the first detection module 112, may transfer the parameters of the above-mentioned call, defined as unwanted, to the unwanted subscriber's application 131 using the transfer tool 223.

In an aspect, the unwanted subscriber's application 131 may protect the protected subscriber's data on the unwanted subscriber's device 130 based on the unwanted call parameters, by performing at least one of the following actions:
notifying a third-party application 132 installed on the unwanted subscriber's device 130 that the call is identified as unwanted;
changing the information security settings of the unwanted subscriber's device 130 on which the application 131 is installed;
notifying the protected subscriber's application 141 that the call is identified as unwanted;
ending the current call and blocking subsequent incoming or outgoing calls with the protected subscriber, which is determined from the identifier of the protected subscriber included among the unwanted call parameters.

In an aspect, the change in the information security settings of the devices 130 and 140 may include, but is not limited to, one or more of the following:
performing an antivirus check using up-to-date antivirus scanners 133 or 143, respectively;
changing the network parameters;
restricting device functionality;
restricting the device from interacting with other devices;
restricting access to device resources;
enabling multifactor authentication;
updating the security tools on the device;
receive feedback on the results of the above measures.

In an aspect, the antivirus scanners 133 and 143 may additionally be configured to change the information security settings of other devices of the subscriber, for example, the security settings containing data to be protected. For example, the first detection tool 112 may have identified the subscriber of device 130 as unwanted but the subscriber of device 140 as protected. Also, the first detection tool 112 may have identified the data operator as a bank based on the results of the analysis of the additional parameters of the call. For example, the unwanted subscriber may have claimed to be acting on behalf of the above-mentioned bank or demanded to know the bank card data issued by the given bank. In this example, the bank data of the protected subscriber in the given bank may be defined as the data to be protected. If on the protected subscriber's device 140 a third party application 142 (e.g., online banking application of a particular bank) is installed, the protected subscriber's data may be protected using the protected subscriber's application 141 based on the parameters of the unwanted call. For example, the protected subscriber's data may be protected by notifying the third party application 142. The third party application 142 in turn may block the bank's cards by strengthening the protection of bank card data, including, for example, the use of multifactor authentication for completing bank card transactions, etc. In addition, if the protected subscriber has other devices (such as a computer, telephone, etc.) on which the protected data (bank card data) is stored, the application 141 may notify these devices that an unwanted call has been detected. The data on the specified additional devices may also be protected.

In an aspect, the security agent of the data operator 151 may protect the data of the protected subscriber on the data operator server 150, based on the parameters of the unwanted call by at least one of the following methods:
restricting access to protected subscriber data, wherein the protected subscriber may be determined from parameters of the unwanted call using the protected subscriber identifier;
providing additional protection against access to the protected subscriber's data;
revoking previously granted access to the protected subscriber's data.

In an aspect, the security agent 114 on the communication provider's server 110 may provide protection for the data of the protected subscriber based on the parameters of the unwanted call by one of the following methods:
ending an unwanted call (for example, by disabling the channel port on which the call traffic is transmitted, or interrupting the network), wherein the unwanted call parameters (for example, subscriber identifiers) may be used to establish the channel port on which the call traffic is transmitted;

notifying the protected subscriber about the identification of the call as unwanted, wherein the protected subscriber is determined from parameters of the unwanted call using the identifier of the protected subscriber;

ending the current call and blocking subsequent incoming or outgoing calls with the unwanted subscriber, wherein the unwanted subscriber is determined from the parameters of the unwanted call using the identifier of the unwanted subscriber;

notifying financial institutions; such as banks, brokerage houses, and credit unions; merchants; law enforcement agencies; and the like of the unwanted call and the unwanted subscriber.

In a particular embodiment, the parameters of the above-mentioned call additionally include the context of the call, in particular: the number of previous calls between the subscribers concerned, the parameters of the previous calls concerned.

In an aspect, the call parameters additionally may include the context of the subscriber's device 130 or 140, respectively, on which the application 131 or the application 141 is installed. The aforementioned device context may additionally be obtained from the application for at least one subscriber. The device context may include, but is not limited to:

data from the device sensors;
interaction between the device and other devices on the network 120;
access to the device resources;
list of resources to be accessed;
device characteristics;
data transfer;
type of data transferred;
anti-virus events;
device security events;
information about interaction with payment services and applications.

In an aspect, the first detection module 112 may additionally include an administration tool 229 for providing feedback from the administrator. The administration tool 229 may be employed in the preliminary analysis and the re-analysis, for example, by adjusting the call parameters. For example, using feedback, calls in the training sample may be tagged as unwanted/regular. In an aspect, the administration tool 229 may be used to configure signatures, heuristics, and machine learning model parameters. Similarly, the remote server 210 may comprise a remote administration tool 219 for performing similar functionality to the administration tool 229 on the remote server 210.

FIG. 3 is an example system diagram illustrating antivirus scanner modules of the devices 130 and 140, respectively, for protecting subscribers' devices. The antivirus scanner 133, 143 (or other security tool) of the devices 130, 140 may include modules configured to ensure the security of the device: on-access scanner 302, on-demand scanner 304, mail antivirus 306, web antivirus 308, proactive protection module 320, a HIPS module (Host Intrusion Prevention System) 310, a DLP module (Data Loss Prevention) 312, vulnerability scanner 314, emulator 318, firewall 316, etc. In an aspect, these modules may be an integral part of the antivirus scanner 133, 143. In another aspect, these modules may be implemented as separate software components.

The on-access scanner 302 may be configured to detect malicious activity of all files opened, launched, and stored on the user's computer system. The on-demand scanner 304 differs from the on-access scanner 302 in that it may scan user-defined files and directories on demand.

Mail antivirus 306 may be configured to monitor incoming and outgoing e-mail for malicious content. Web antivirus 308 may be configured to prevent the execution of malicious code that may be present on websites visited by the user, and to block the opening of websites. The HIPS module 310 may be configured to detect unwanted and malicious activity of programs and block them at the time of execution. The DLP module 312 may be configured to detect and prevent sensitive data from being leaked outside of a computer or network. The vulnerability scanner 314 may be configured to identify vulnerabilities on a device (for example, some security components may be disabled, virus databases not up to date, a network port is open, and so on). The firewall 316 may be configured to monitor and filter network traffic according to the pre-defined rules. The emulator 318 may be configured to simulate the guest system during execution of the file instructions in the emulator 318 and will be discussed in greater detail below. The proactive protection module 320 may be configured to use behavioral signatures to determine the behavior of applications and classify them according to trust level.

Figure 4:
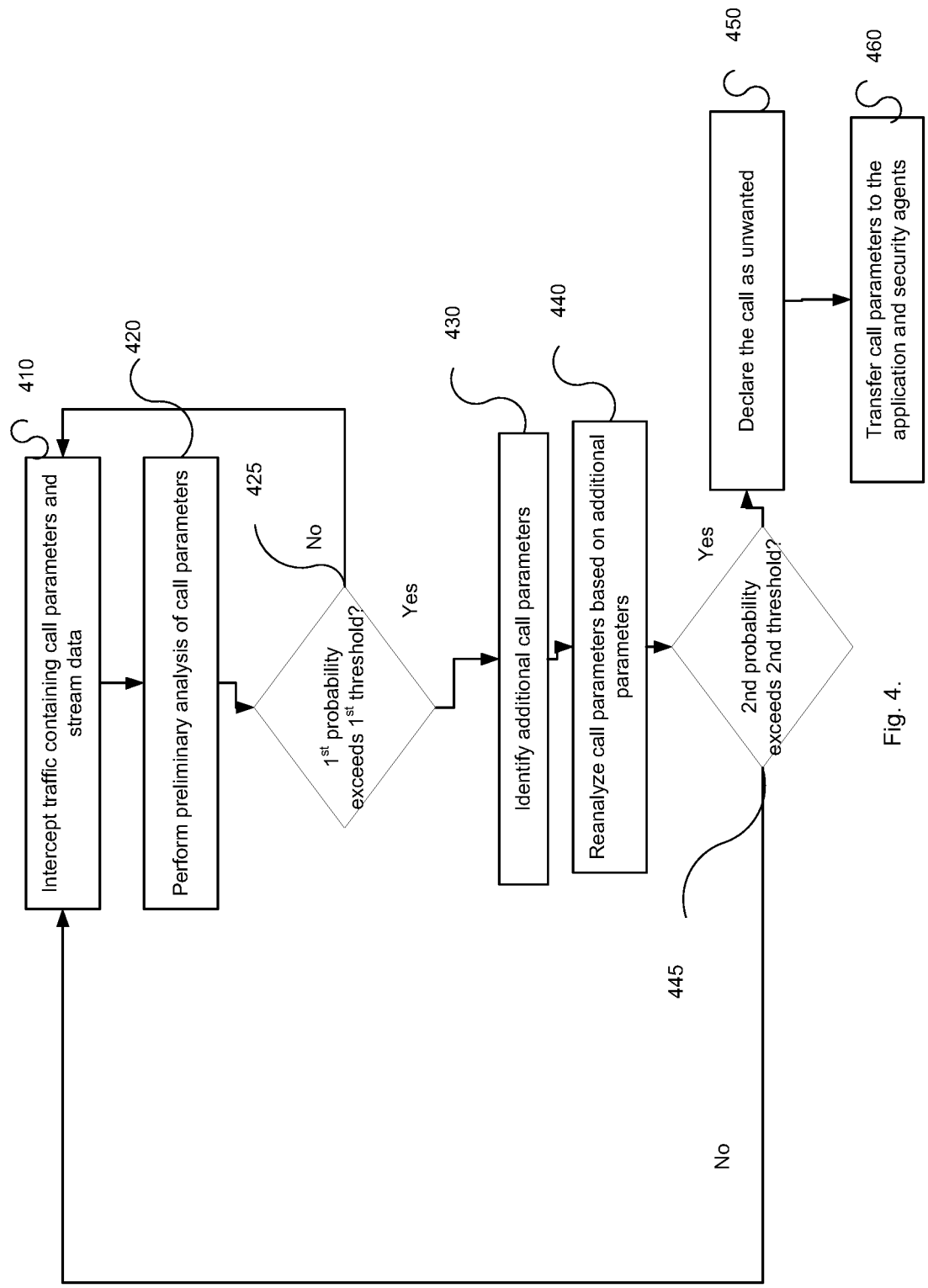
FIG. 4 is an example of a flowchart illustrating a method for protecting subscriber data in event of an unwanted call.

FIG. 4 is an example of a flowchart illustrating a method for protecting subscriber data in event of an unwanted call. In an aspect, in step 410, the first detection module 112 connected to the gateway 115 on the communication provider's server 110 may intercept traffic containing call parameters and call stream data. Next, in step 420, the first detection module 112 may be configured to perform a preliminary analysis of the call parameters. The results of the preliminary analysis may be used to determine a first probability of the call being identified as unwanted. At step 425, the first detection module 112 may determine if the first probability exceeds a first threshold. In the event that the first probability exceeds the first threshold value (step 425, yes branch), in step 430, the first detection module 112 may utilize call stream data analysis to determine additional parameters for the call. If the first probability does not exceed the first threshold value (step 425, No branch), the first detection module 112 may return to step 410. In an aspect, in step 430 the first detection module 112 may determine information about the data operator (e.g., name, identifier) associated with at least one subscriber. In step 440, the first detection module 112 may perform a re-analysis of the call parameters based on the additional parameters. The results of reanalysis may determine the second probability of the call being unwanted. At step 445, the first detection module 112 may determine if the second probability exceeds a second threshold. If the second probability exceeds the second threshold value (step 445, yes branch), in step 450 the first detection module 112 may declare the call as unwanted, identify subscriber making the unwanted call and the subscriber whose data is to be protected. The call parameters may be supplemented with tags indicating the unwanted subscriber and the protected subscriber, as well as information that the call has been defined as unwanted. The unwanted subscriber tag may be set according to the subscriber identifier recognized as unwanted, and the protected subscriber tag may be set according to the subscriber identifier recognized as protected. Thus, the specified tag may be used to uniquely identify which subscriber identifier identifies the unwanted subscriber and which one identifies the protected subscriber. As a result, in step 460, using at least the first detection module 112, may transmit all parameters (i.e., including the additional parameters) of the given call, identified as unwanted, to at least one of the following: an application 141 on the protected subscriber's device 140, a security agent 151 of the at least one above-mentioned data operator (according to the information on the data operator in the additional call parameters), a security agent 114. The specified applications and security agents protect the protected subscriber's data based on the parameters of the unwanted call.

It should be noted that aspects described in conjunction with FIGS. 1-3 also apply to the method illustrated in FIG. 4. Thus, a reduction of false positive errors may be achieved by increasing the level of detection of unwanted calls, as was mentioned earlier. The reduction of false negative errors may be achieved by using a preliminary and repeated analysis of the call parameters, thus reducing the likelihood of a regular call being identified as unwanted.

Improvement in the protection of subscriber data in the event of an unwanted call may be achieved by protecting the data of the protected subscriber by the application 141 on the protected subscriber's device 140, by the security agent 151 of the at least one data operator 150, and the security agent 114 on the communication provider's server 110 after the call is identified as unwanted.

Also, the stated technical problem may be solved by increasing the level of detection of unwanted calls.

It should be noted that described aspects may analyze both the traffic of an ongoing call and the traffic of a completed call. That is, even the analysis of a completed call and identification of this call as unwanted may allow the data of the protected subscriber to be protected. After all, the threat to the data may occur both during the call and after the call is completed. For example, the protected subscriber may attempt to transfer money to the attacker after the call has ended, based on the details obtained during the call. In this case, the application 141 on the protected subscriber's device 140 may inform the first detection module 112 about changes to the context of the protected subscriber's device 140. Then the first detection module 112 may re-analyze the call based on the updated call parameters. In doing so, the re-analysis of the call will declare it as unwanted. This declaration may provide protection for the subscriber's data, for example by blocking the specified transfer by means of the application 141 or the security agent 151 on the data operator server 150 (in this example, the bank). Thus, the call can be analyzed multiple times when the call parameters change or when new stream data is received. Therefore, even if there was not enough data during the call to declare the given call as unwanted, the call may end up being declared as unwanted after the call context has changed.

Thus, in both cases, the technical results may be achieved, namely a reduction in the first and second types of errors in the detection of unwanted calls and an increase in the level of protection of subscriber data in the event of an unwanted call.

Figure 5:
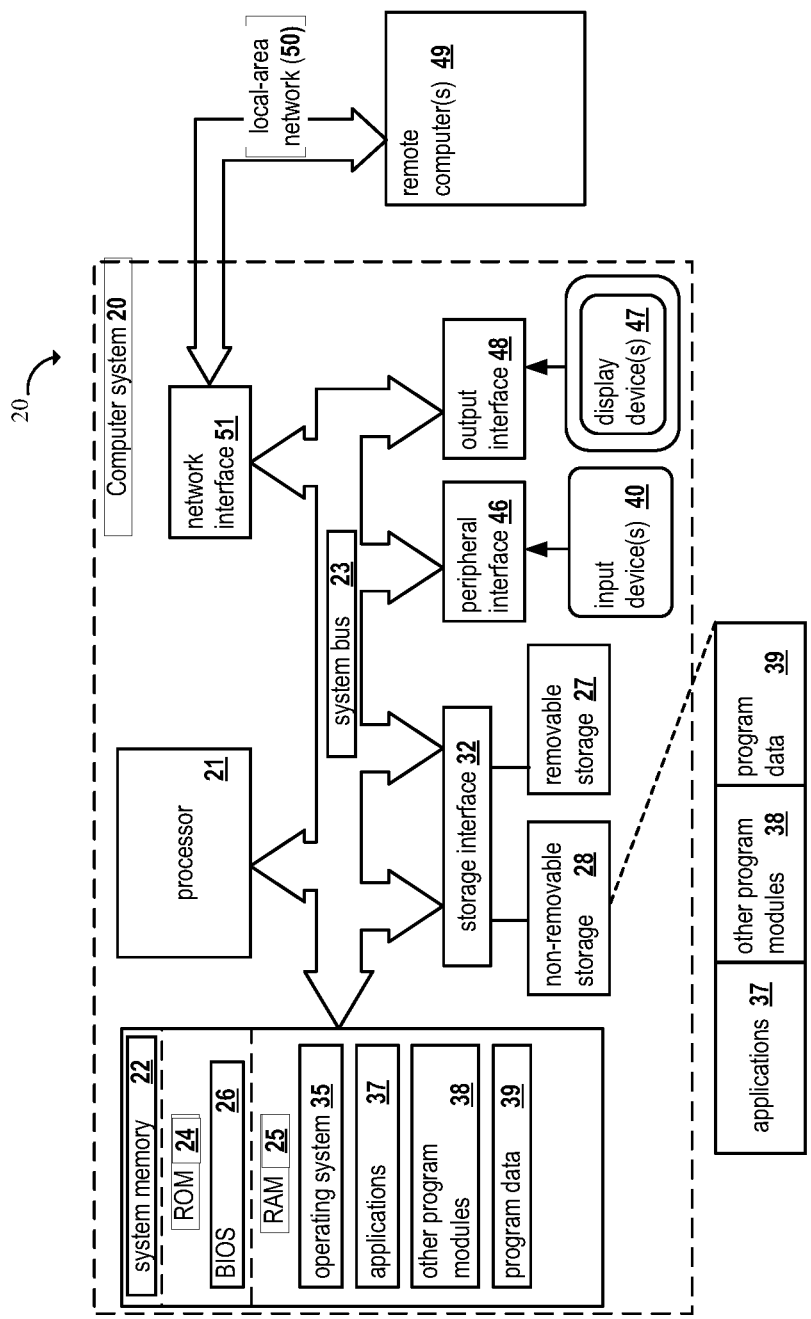
FIG. 5 shows an example of a computer system on which variant aspects of systems and methods disclosed herein may be implemented.

FIG. 5 shows an example of a computer system on which variant aspects of systems and methods disclosed herein may be implemented. The computer system 20 may represent the system for protecting subscriber data in the event of unwanted calls 100 of FIG. 1 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting subscriber data in the event of an unwanted call, the method comprising:

intercepting network traffic associated with a call, the network traffic comprising call parameters and call stream data, wherein the call parameters include two or more subscriber identifiers;

analyzing, by a processor, a first set of the call parameters to generate a first set of results;

determining a first probability value of the call being declared as unwanted based on the first set of results;

determining if the first probability value exceeds a first threshold value;

analyzing the call stream data to define a second set of call parameters, in response to determining that the first probability value exceeds the first threshold value, wherein the second set of call parameters includes information about a data operator associated with at least one of the two or more subscriber identifiers, the data operator being an entity responsible for organizing or processing of the personal data, the composition of the personal data subject to processing, and actions to be performed with the personal data;

reanalyzing the first set of call parameters based on the second set of call parameters to generate a second set of results;

determining a second probability value of the call being declared as unwanted based on the second set of results;

determining if the second probability value exceeds a second threshold value;

declaring the call as unwanted, in response to determining that the second probability value exceeds the second threshold;

identifying a protected subscriber associated with the unwanted call and an unwanted subscriber associated with the unwanted call; and transmitting the first set of call parameters and the second set of call parameters to an application configured to protect data of the protected subscriber.

2. The method of claim 1, further comprising:

inserting two or more tags into the second set of call parameters, in response to determining that the second probability value exceeds the second threshold, wherein the two or more tags declare the subscriber originating the unwanted call as the unwanted subscriber and declare the subscriber receiving the unwanted call as the protected subscriber.

3. The method of claim 1, wherein the call stream data comprises at least one of the following: an audio stream, a video stream, an audio-visual stream, an instant message stream, a random-format data stream.

4. The method of claim 3, wherein analyzing the call stream data comprises analyzing, the call stream data using one or more speech recognition techniques, if the call stream data comprises the audio stream; and converting the analyzed audio stream into text.

5. The method of claim 3, wherein analyzing the call stream data comprises analyzing, the call stream data using one or more image recognition techniques, if the call stream data comprises the video stream; and converting the analyzed video stream into text.

6. The method of claim 3, further comprising extracting text from the call stream data and analyzing the extracted text using one or more of the following techniques: text mining, semantic analysis and syntactic analysis.

7. The method of claim 6, wherein extracting text from the call stream data further comprises extracting keywords, phrases and lexemes for determining information about the data operator by matching the extracted keywords, phrases and lexemes with known keywords, phrases and lexemes associated with information about the data operator.

8. The method of claim 6, wherein the second set of call parameters includes at least one of: keywords, phrases, lexemes present in the call stream data and tonality of the text extracted from the call stream data.

9. The method of claim 1, wherein analyzing and reanalyzing the first set of the call parameters comprises performing a signature analysis wherein the first set of the call parameters is compared to a signature of an unwanted call.

10. The method of claim 1, wherein analyzing and reanalyzing the first set of the call parameters comprises performing a heuristic analysis wherein the first set of the call parameters is compared to heuristics of an unwanted call.

11. The method of claim 1, wherein analyzing and reanalyzing the first set of the call parameters comprises performing an analysis using a trained machine learning model to classify the call, wherein the trained machine learning model receives the first set of the call parameters as the first set of results, and wherein the trained machine learning model generates the first probability value of the call being declared as unwanted based on the first set of results.

12. A system for protecting subscriber data in the event of an unwanted call, the system comprising:

a detection module connected to a gateway on a server of a communication provider, a hardware processor of the detection module configured to:

intercept network traffic associated with a call, the network traffic comprising call parameters and call stream data, wherein the call parameters include two or more subscriber identifiers;

analyze a first set of the call parameters to generate a first set of results;

determine a first probability value of the call being declared as unwanted based on the first set of results;

determine if the first probability value exceeds a first threshold value;

analyze the call stream data to define a second set of call parameters, in response to determining that the first probability value exceeds the first threshold value, wherein the second set of call parameters includes information about a data operator associated with at least one of the two or more subscriber identifiers, the data operator being an entity responsible for organizing or processing of the personal data, the composition of the personal data subject to processing, and actions to be performed with the personal data;

reanalyze the first set of call parameters based on the second set of call parameters to generate a second set of results;

determine a second probability value of the call being declared as unwanted based on the second set of results;

determine if the second probability value exceeds a second threshold value;

declare, the call as unwanted, in response to determining that the second probability value exceeds the second threshold;

identify, a protected subscriber associated with the unwanted call and an unwanted subscriber associated with the unwanted call; and transmit the first set of call parameters and the second set of call parameters to an application configured to protect data of the protected subscriber.

13. The system of claim 12, wherein the hardware processor is further configured to:

insert two or more tags into the second set of call parameters, in response to determining that the second probability value exceeds the second threshold, wherein the two or more tags declare the subscriber originating the unwanted call as the unwanted subscriber and declare the subscriber receiving the unwanted call as the protected subscriber.

14. The system of claim 12, wherein the call stream data comprises at least one of the following: an audio stream, a video stream, an audio-visual stream, an instant message stream, a random-format data stream.

15. The system of claim 14, wherein the hardware processor configured to analyze the call stream data is further configured to analyze the call stream data using one or more speech recognition techniques, if the call stream data comprises the audio stream; and configured to convert the analyzed audio stream into text.

16. The system of claim 14, wherein the hardware processor configured to analyze the call stream data is further configured to analyze the call stream data using one or more image recognition techniques, if the call stream data comprises the video stream; and configured to convert the analyzed video stream into text.

17. The system of claim 14, wherein the hardware processor is further configured to extract text from the call stream data and analyze the extracted text using one or more of the following techniques: text mining, semantic analysis and syntactic analysis.

18. The system of claim 11, wherein the hardware processor configured to extract text from the call stream data is further configured to extract keywords, phrases and lexemes for determining information about the data operator by matching the extracted keywords, phrases and lexemes with known keywords, phrases and lexemes associated with information about the data operator.

19. A non-transitory computer readable medium storing thereon computer executable instructions for protecting subscriber data in the event of an unwanted call, including instructions for:

intercepting network traffic associated with a call, the network traffic comprising call parameters and call stream data, wherein the call parameters include two or more subscriber identifiers;

analyzing a first set of the call parameters to generate a first set of results;

determining a first probability value of the call being declared as unwanted based on the first set of results;

determining if the first probability value exceeds a first threshold value;

analyzing the call stream data to define a second set of call parameters, in response to determining that the first probability value exceeds the first threshold value, wherein the second set of call parameters includes information about a data operator associated with at least one of the two or more subscriber identifiers, the data operator being an entity responsible for organizing or processing of the personal data, the composition of the personal data subject to processing, and actions to be performed with the personal data;

reanalyzing the first set of call parameters based on the second set of call parameters to generate a second set of results;

determining a second probability value of the call being declared as unwanted based on the second set of results;

determining if the second probability value exceeds a second threshold value;

declaring the call as unwanted, in response to determining that the second probability value exceeds the second threshold;

identifying a protected subscriber associated with the unwanted call and an unwanted subscriber associated with the unwanted call; and transmitting the first set of call parameters and the second set of call parameters to an application configured to protect data of the protected subscriber.

20. The non-transitory computer readable medium of claim 19, further comprising instructions for:

inserting two or more tags into the second set of call parameters, in response to determining that the second probability value exceeds the second threshold, wherein the two or more tags declare the subscriber originating the unwanted call as the unwanted subscriber and declare the subscriber receiving the unwanted call as the protected subscriber.

* * * * *